Aug. 21, 1923.

C. E. G. PALMEN

TIRE COVER

Filed Jan. 24, 1921

1,465,313

INVENTOR.
Carl E. G. Palmen

Patented Aug. 21, 1923.

1,465,313

UNITED STATES PATENT OFFICE.

CARL E. G. PALMEN, OF LOS ANGELES, CALIFORNIA.

TIRE COVER.

Application filed January 24, 1921. Serial No. 439,657.

*To all whom it may concern:*

Be it known that I, CARL E. G. PALMEN, a citizen of the United States, and a resident of Los Angeles, in the county of Los Angeles, State of California, have invented new and useful Improvements in Tire Covers, of which the following is a specification.

My invention relates to covers of weatherproof character for use on automobile tires and the main object is to provide a cover which is adaptable to wheels and rims of different types and particularly adapted to closely fit on the tire and to overlie the rim in such a manner as to completely exclude the elements from contact with the tire when the same is not in use, thus preserving the tire in good condition and lengthening the life thereof.

I am aware that other tire covers partaking generally of the character of my cover have heretofore been used and patented, but I have provided distinct improvements over the general types so as to more completely cover the tire and exclude the wind and rain from within the cover. Some tire covers in use today have overlapping inner flaps which button or are otherwise secured together at their meeting portions and overlie the rims completely, but such types can not be adapted for use on all forms of rims and wheels. Other types have side portions which merely contact with the edges of the rims and thus do not exclude the elements and the tire is thus damaged frequently from exposure. Nearly all types have metal rings of springlike character held in an open seam at each side of the rim on the sides of the cover for holding the cover sides as rigid as possible.

I have provided a cover which embodies all of the good points of the different types of covers mentioned and in addition is peculiarly arranged at the inner edges for overlying the exterior side edges of the rim, and as said overlying portions do not overlap each other or meet at the edges, my cover may be readily adapted to rims and wheels of different character, with equally good results.

In the drawings hereto annexed I have shown one practical embodiment of my improvements, in which similar characters of reference are employed for indicating the same and like parts throughout the several views and by means of which characters the parts are referred to in the specification.

My cover is preferably made of a plurality of segments S, S, etc., stitched together at the ends and forming annular side portions 1, 1, etc., and peripheral portions $a$, $a$, etc., for covering the tread of a tire; two of the adjacent segments being disconnected at 3 and adapted to permit the adjustment of the cover on the tire T. Said portions may be attached together, as shown, by means of snap buttons B of the usual character.

Figure 1:
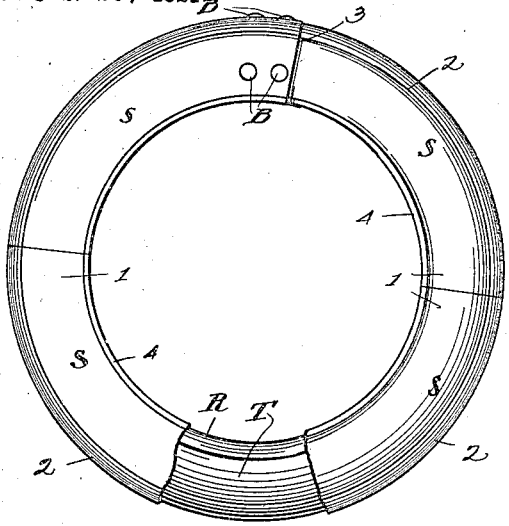
Fig. 1 is a side elevation of my cover attached to a pneumatic automobile tire, the cover being partly broken away.
Figure 2:
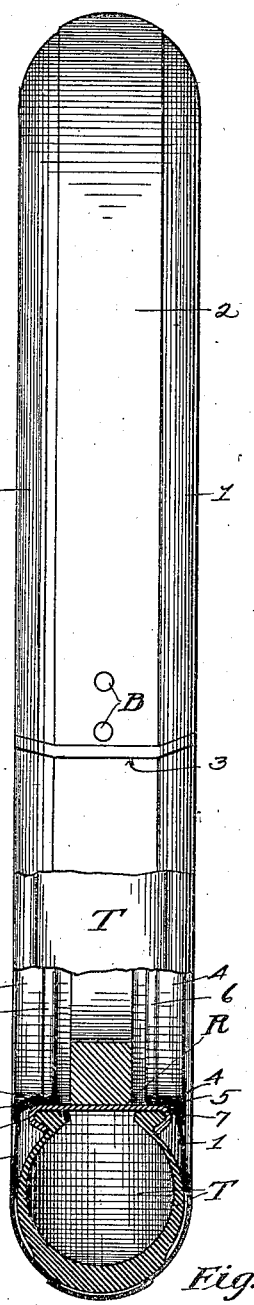
Fig. 2 is a view at right angles to Fig. 1, partly in section to show the arrangement of the cover on the tire.
Figure 3:
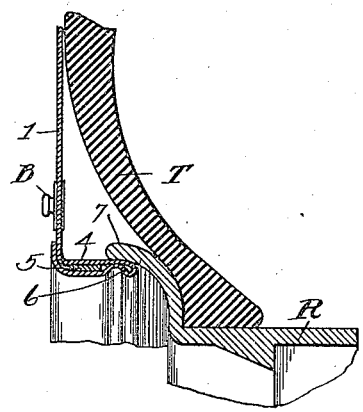
Fig. 3 is an enlarged fragmentary section of my cover adapted for use on a rim of slightly different character from that shown in Figs. 1 and 2.

Either one or both of the side portions 1 have an open seam 4 extending the full length thereof in which a metal band 5 of resilient character is held for the purpose of stiffening the cover at points adjacent to the edges of the rim R on which the tire T is usually carried on an automobile. I provide another open seam, or flap 6 depending from each side 1 of the cover which extends inwardly of the band 5 and the material of the flaps is doubled back to form the seam 4 and is adapted to overlie the adjacent edge of the rim R, as clearly shown in Figs. 2 and 3. The width of this additional flap depends upon the width of the extended portion of the rim and said flap should fit snugly over the edge of the rim when the cover is properly positioned on the tire T and the ends thereof are held together by means of the buttons B.

It will be obvious that when the cover is snugly fitted on the tire and the ends attached together as described, the band 5 being of a proper length for a particular size of tire, the tendency of said band will be to hold the sides 1 of the cover in an approximately true circle adjacent to the edges 7 of the rim R and said band will be disposed almost if not quite in a plane paralleling the inner face of the rim, as shown, and the overlying flap 6 will rest upon the extended edge portions of said rim, and will serve to exclude the elements from contact with the tire, and thus prevent damage thereto.

It will be understood that the cover is made of a suitable waterproof material and that instead of an open seam for forming the additional flap 6 I may use a single thickness of the cover material suitably bound at the edges to prevent the fraying of the strands of which the material is formed. The double thickness, however, in the form of a seam is preferable for the reason that a certain amount of stiffness is thereby provided which would not be the case with but a single thickness, and it is desirable that the flap 6 should fit the rim as snugly as possible.

I desire it understood that while I have provided a cover which is for many reasons more desirable than other covers for this purpose, my principal invention resides in the provision of the flap 6 substantially as shown and described, subject to modification and alteration, within the scope of the appended claims without enlarging the scope or departing from the spirit of my invention, and I desire to claim broadly thereon.

What I claim is:

1. A tire cover having a central strip of material for covering the tread of a tire, side walls attached to said central portion and extended inwardly to circles adjacent the exterior side edges of a tire rim, a flap formed on the inner periphery of each of said side walls, said flaps being doubled back to form a seam, and a metal band held in said seam, the edges of said flaps overlapping the exterior side edges of the rim.

2. A tire cover having a central portion for covering the tread of a tire, annular side walls attached to the opposite edges of said central portion and formed of a plurality of segments attached together at the meeting ends, flaps depending from the inner edges of said side walls and attached thereto, the material of each of said flaps being doubled back so as to provide two thicknesses of material and stitched in lines intermediate the extended edges of the flaps and inner edges of said side walls, so as to provide pockets on each of the sides of said stitching, and metal bands held in the outer pockets thereof for stiffening said side walls, the extended portions of said flaps projecting inwardly and adapted to overlie the edges of a tire rim, as described.

3. A tire cover comprising a central strip of material for covering the tread of a tire, annular side walls formed of a plurality of segments attached together at their ends and attached to said central strip of material at their outer edges, flaps having their outer edges attached to the inner edges of said side walls and adapted to extend substantially at right angles thereto, and doubled back so as to provide two thicknesses of material, the material of said flaps being stitched together in lines intermediate the inner and outer edges of said flaps for providing inner and outer pockets between the two thicknesses of material, and metal bands held in the outer pockets of said flap, the inner portions of said flaps adapted to overlie the exterior side edges of a tire rim, as described.

Signed at Los Angeles, California, this 26th day of Nov., 1920.

CARL E. G. PALMEN.

In the presence of—
LUTHER L. MACK,
E. M. DESSIEUX.